United States Patent Office 2,929,798
Patented Mar. 22, 1960

2,929,798

WRINKLE RESISTANT FABRICS AND PRODUCTS FOR PRODUCING SAME

Rosser Lee Wayland, Jr., Edgewood, Md., and Marks Purrington Underwood and George S. Y. Poon, Danville, Va., assignors to Dan River Mills, Incorporated, Danville, Va., a corporation of Virginia No Drawing. Application December 9, 1955
Serial No. 552,231

19 Claims. (Cl. 260—67.6)

This invention relates to the manufacture of wrinkle resistant cotton fabrics and chemical products useful for that purpose. More particularly, it relates to production of condensation products of substituted melamines and the application of those products to textile fabrics to make them wrinkle resistant.

It is an object of this invention to provide new chemicals which are useful for treatment of textile fabrics and which serve as intermediates in the production of chemicals useful for the production of non-chlorine retentive cotton textile fabrics. It is also an object of this invention to provide a process for manufacturing new resin-forming materials for use in the textile industry and elsewhere.

It is also an object of this invention to provide new chemicals which are particularly useful for the production of textile fabrics in which degradation from chlorine retention is minimized and yellowing from chlorine retention is avoided.

It is a further object of this invention to provide a process for treating textile fabrics to produce wrinkle resistant properties without the disadvantage of deleterious chlorine retention. It is a further object of this invention to provide a cotton textile fabric characterized by high wrinkle resistance, good physical properties in terms of tear strength and tensile strength and by strong resistance to deleterious action from chlorine bleaches. Other objects of the invention will be apparent from the detailed specification.

According to the present invention, at least three mols, preferably 3.5 mols, of dimethylol ethylene urea are reacted with one mol of melamine to produce an intermediate product (A) which is water-soluble and which may be used for the treatment of textile fabrics to produce wrinkle resistance. According to the preferred process of this invention, the intermediate product (A) is then reacted with from about one to six mols of formaldehyde to produce a final product (B) which is useful for treating cotton textile fabrics to produce wrinkle resistance without the disadvantages of deleterious chlorine retention.

Lesser quantities of formaldehyde do not appear to safeguard against the harmful effects of chlorine retention to an adequate extent. Larger quantities of formaldehyde have little beneficial effect, and a large excess of formaldehyde will lower the physical properties of the treated fabric.

Both condensations may be carried out under acid, basic or neutral conditions. However, care must be exercised in operation on the acid side, as there is a strong tendency toward polymerization under such conditions and the condensation reaction is rarely controllable at below about pH 6.5.

If resinification of either the intermediate or final condensation products of the invention is desired, it may be accomplished by further reaction on the acid side. If stable resin-forming products are desired, the pH of the final product must be carried well to the alkaline side.

It is well to note at this point that there are two separate and distinct dangers to be avoided in the preparation of these products. One of these dangers is polymerization. This may occur at any time after the first reaction is started, and may even occur after storage of the finished products. Low pH favors polymerization which may take place rapidly if the pH is low enough or very slowly under borderline conditions.

A small amount of polymerization may not be harmful. The evil effects are first noted by a failure of the partially polymerized products to retain their water solubility on infinite dilution. A greater degree of polymerization results, of course, in solidification of the product. Obviously polymerization is irreversible.

The other danger is a stability problem, namely, one of precipitate formation in the stored reaction products of this invention. The chemical nature of the problem is unknown, but whatever the reaction for producing such precipitates, it appears to be reversible, as heating the precipitated product will clear it. However, heating the product each time it is to be used is highly unsatisfactory on a commercial basis and precipitated products are generally considered unsatisfactory. In the following discussion, the precipitate problem is also referred to as a stability problem.

In the production of a chemical product (B) which will produce non-chlorine retentive textile fabrics, it is quite important to regulate the conditions of reaction if one is to obtain a stable product which is infinitely dilutable in water. There is a relatively narrow range of reaction conditions which will permit the obtention of desired properties. In this connection, it should be remembered that there is a first reaction (1) or condensation of one mol of melamine with 3.5 mols of dimethylol ethylene urea to form an intermediate product (A) and a second reaction (2) of product (A) with 3 mols of formaldehyde to form a final product (B).

As an example of the problems involved, under most conditions, if the pH of the reactions (1) or (2) is below about 6.2, the final product (B) will either become insoluble immediately or else will form a hazy solution when diluted with water, due to polymerization. On the other hand, if reaction (1) is carried out at 200° F. for ten minutes at a high pH of about 10 to 11, the final product (B) will have only limited stability with a precipitate coming out in increasing amounts after a few days.

The critical pH range of reaction (1) for obtaining satisfactory commercial materials appears to be from about pH 6.5 to pH 8.5. It should be noted, however, that this range is not an absolutely constant one under all reaction conditions. The problem of precipitate formation in product (B) may be greatly alleviated by using conditions in reaction (1) which include refluxing an aqueous solution of dimethylolethylene urea with melamine. On the other hand, the precipitate formation is aggravated by finishing off the final product (B) at a pH higher than about 9.5 to 10. For example, if the final product (B) is to be stored at pH 11, the critical pH range of the initial reaction (1) to prevent precipitate formation is no longer from about pH 6.5 to pH 8.5, but rather from about pH 6.5 to pH 7.5.

It also appears that these critical pH conditions may be satisfied to some extent by controlling only the pH of the second reaction (2), namely, the condensation of the first formed product (A) with formaldehyde. For example, it appears that if dimethylolethylene urea is condensed with melamine at 200° C. for 15 minutes at pH 11, a stable product can still be obtained if this intermediate product (A) is reacted with 3 mols of formaldehyde at pH 6.5 to 7 to form product (B).

Thus, several factors including time, temperature and pH of both reactions (1) and (2), as well as the final pH of the product B have an influence on the stability characteristics of the final product B in terms of both precipitate formation and polymerization. It appears that the optimum conditions are reflux temperatures for about 15 minutes, or until the melamine dissolves, at about pH 8 for reaction (1), a temperature of from about 160°–180° F. for about 15 minutes at about pH 7.5 for reaction (2) and the final pH of product B should be adjusted to about pH 9 to 9.5.

It has been determined by extended experimental investigation that any one of these conditions may be rather widely varied provided the other conditions are appropriately adjusted. However, to obtain a stable, substantially unpolymerized product (B), it appears critical that the pH of either reaction (1) or (2) be held within the range of pH 6.5 to 8.5, that reaction (1) be at a temperature from about 180° F. to reflux for a time sufficient to dissolve all the melamine, that reaction (2) be at a temperature of from about 140° F. to 190° F., and that the final pH of the thus-formed product shall be from about pH 8 to pH 11.

Satisfactory wrinkle resistance can be obtained on textile fabrics with either product (A) or (B) by impregnating cellulosic fabric with from about 5% to 15% of the condensation product in the presence of a small quantity of an acid or acid-forming catalyst and thereafter heating the impregnated fabric to dry it and to cure the resin. To obtain the same degree of wrinkle resistance without danger from chlorine retention necessitates neutralizing the alkalinity of the fabric at some time prior to the final cure, impregnating the fabric with about 5% to 15% of the final condensation product (B) of the intermediate (A) with formaldehyde and heating the thus impregnated fabric to dry it and to impart a hard cure to the resin.

Neutralization of the fabric can be accomplished by two means. The fabric can be neutralized prior to impregnation by treatment in an acid bath such as acetic acid solution or a mild sulfuric acid solution. Such neutralization must be carefully carried out to assure that the fabric contains no more than .1% residual alkali measured as sodium hydroxide.

Another method of neutralization is to determine the amount of residual alkali in the fabric to be treated and then add enough catalyst, in excess of the amount required for catalysis, to neutralize the alkali found on the fabric.

To obtain a hard cure one must balance the conditions regulating cure which include time, temperature and amount of catalyst used for catalysis. The final regulation in the treating step is usually accomplished by regulating the time and temperature of the cure and raising one or the other as required to produce a fabric which has the desired properties of resistance to the harmful effects of chlorine bleach. Exceptionally high temperatures must be avoided to prevent damaging the fabric and unusually long cures are not commercially attractive.

In the reaction (1) of melamine with dimethylol ethylene urea, it is necessary to use at least three mols of the dimethylol ethylene urea for each mol of melamine. If lesser quantities of dimethylol ethylene urea are used, the melamine will not go into solution and it is desirable to add at least three and one-half mols of the dimethylol ethylene urea to avoid a tendency to cloudiness. Addition of a larger quantity of the dimethylol ethylene urea has no adverse effect on the physical nature of the reaction product, but it does have an adverse effect on the nature of textile fabrics treated with the product in that larger quantities of the dimethylol ethylene urea appear to lessen the desirable subjective qualities of hand and the like which are characteristic of melamine treated fabrics. Likewise, the additional quantities of the dimethylol ethylene urea appear to lower the tear strength of the treated fabric, and they appear to make the chemical product more sensitive to varied conditions of cure and less likely to produce uniformly satisfactory results in terms of the treated fabric's resistance to the harmful effects of chlorine retention.

The exact nature of the reaction products of this invention has not been fully determined, but it appears that the intermediate reaction product (A) of one mol of melamine with three mols of dimethylol ethylene urea has the following formula:

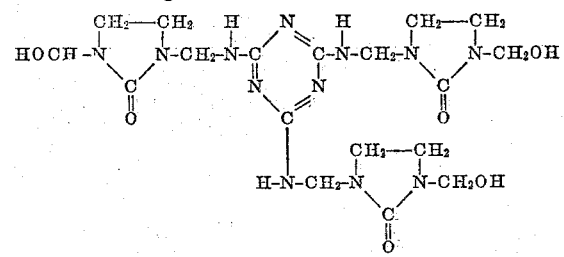

It is further theorized that the second reaction; namely, the reaction of the intermediate with formaldehyde forms a compound (B) having the following formula:

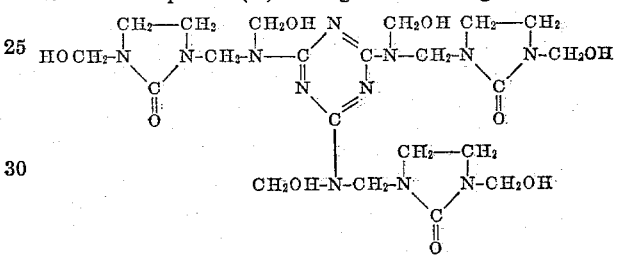

In any event, the intermediate (A) and the final product (B) are substantially equivalent products for producing wrinkle resistant textile fabrics where the only consideration is the production of high wrinkle resistance with good physical properties. The final product finds its superiority over the intermediate product primarily in those instances where resistance to chlorine is an important factor.

Typical examples of this invention are as follows:

*Example I*

Eight hundred seventy-four pounds (3.0 mols) of a 50% solids solution of dimethylol ethylene urea were placed in a stainless steel reaction kettle equipped with heating coils and a stirrer. One hundred twenty-six pounds (one mol) of melamine were added with stirring. Twenty-five percent sodium hydroxide solution was added until the pH of the mixture was 10.0 to 11.0 and the temperature was raised to 200° F. and maintained until the solution tended to clear, which was about 30 minutes after the desired temperature had been reached. This intermediate product (A) was cooled to 150° F. and 243 pounds (3 mols) of formaldehyde (37%) were added. The solution was then heated to 180° F. for about fifteen minutes and was then neutralized to about pH 8.5 to 9.5. The product (B) thus formed was a clear liquid. It appeared to be stable and infinitely soluble in water and about the viscosity of ethylene glycol.

*Example II*

One thousand forty pounds (3.5 mols) of a 50% solution of dimethylol ethylene urea were placed in a stainless steel reaction kettle equipped with heating coils and a stirrer. One hundred twenty-six pounds (1 mol) of melamine were added with stirring, and enough sodium hydroxide solution was added to bring the pH of the mixture to 10–11. The temperature was raised to 200° F. and maintained until the solution cleared, which was about 15 minutes after the desired temperature had been reached. The resulting solution was substantially clear and water-soluble; although on repeated runs, cloudiness could be detected occasionally. This intermediate product (A) was cooled to 150° F. and 243 pounds (3 mols) of formaldehyde (37%) were added. The solution was then heated to 180° F., and about fifteen minutes later, it was completely clear. It was then neutralized back to about pH 8.5 to 9.5. The solution (B) appeared to be stable and infinitely soluble in water. However, on long standing a precipitate sometimes formed and though it could be dissolved by heating, the product was considered commercially undesirable. It had about the same viscosity and general appearance as the final product of Example I. This example was repeated twice, once using one and once using two mols of formaldehyde instead of three mols. The results were about the same all three times.

*Example III*

Seventeen hundred fifty pounds (6 mols) of a 50% solution of dimethylol ethylene urea were placed in a stainless steel reaction kettle equipped with heating coils and a stirrer. One hundred twenty-six pounds (1 mol) of melamine were added with stirring, and enough sodium hydroxide was added to bring the pH to 10–11. The temperature was raised to 200° F. and maintained until the solution cleared, which was about fifteen minutes after the desired temperature had been reached. The resulting solution (A) was completely clear and water-soluble. This intermediate product (A) was cooled to 150° F. and 243 pounds (3 mols) of formaldehyde were added. The solution was then heated to 180° F. and about 15 minutes later it was neutralized back to about pH 8.5 to 9.5. The solution (B) appeared to be stable and infinitely soluble in water. It had the same viscosity and general appearance of the final product of Example I.

*Example IV*

An unsoured cotton fabric running about 4.5 yards per pound, which had been peroxide bleached and mercerized, was impregnated with a water solution containing 10% of the intermediate product (A) of Example II and 1½% of Catalyst AC (37% 2-methyl 2-aminopropanol-1 hydrochloride). The fabric picked up about 65% of its weight of the solution. It was then air dried and cured for 70 seconds at 180° F. The fabric was wrinkle resistant and had good physical properties, but did not show uniformly low resistance to chlorine degradation. However, the fabric did not yellow in the manner of those treated with melamine-formaldehyde resin and subsequently treated with chlorine.

*Example V*

The process of Example IV was repeated on unsoured cloth, using the final product (B) of Example II in place of the intermediate (A). The results of Example IV were generally duplicated.

*Example VI*

A bleached and mercerized cotton fabric containing about .3% alkali measured as sodium hydroxide was first soured in a .25% acetic acid solution until the residual alkali was only about .1% titrated as sodium hydroxide. The fabric was then dried without further washing. A portion of the fabric thus prepared was treated with a solution containing 11% of the intermediate product (A) of Example II and 1½% of Catalyst AC. The sample was air dried and heated to 180° C. for 70 seconds. The thus treated fabric had a high degree of wrinkle resistance; had good physical properties in that it had lost little of its tear strength and tensile strength; but, it did not show uniformly good resistance to chlorine when tested by the AATCC scorch test method. Like the fabric of Examples IV and V, the product of this example did not yellow upon treatment with chlorine.

*Example VII*

Another portion of the fabric prepared for Example VI was treated in an identical manner except that the final product (B) of Example II was used instead of the intermediate product (A). The thus treated fabric appeared to have the same properties as the fabric treated in accordance with Example VI except that it showed uniformly high resistance to chlorine degradation when tested by the AATCC scorch test method (Tentative Test Method 69–52, entitled "Damage Caused by Retained Chlorine"). The same results were obtained with the products made according to the alternate procedures of Example II, except that the lesser quantities of formaldehyde showed a slight tendency to reduce uniformity of the low damage from chlorine retention.

*Example VIII*

Another portion of the fabric prepared for Example VI was treated in exactly the same manner as in Example VI, except that the final product (B) of Example I was used instead of the intermediate product (A) of Example II. The thus treated fabric appeared to be substantially identical to the fabric treated in accordance with Example VII, as all differences in test results were found to be within the range of experimental error.

*Example IX*

Another portion of the fabric prepared for Example VI was treated in exactly the same manner as in Example VI, except that the final product (B) of Example III was used instead of the intermediate product (A) of Example II. The thus treated fabric appeared to be substantially identical to the fabric treated in accordance with Example VII, as all differences in test results were found to be within the range of experimental error.

*Example X*

A bleached and mercerized cotton fabric containing about .3% alkali titrated as sodium hydroxide was treated with a solution containing 10% of the final reaction product (B) of Example II and about 5.5 of Catalyst AC. The fabric picked up 70% of its weight of solution and was then air dried. After drying, it was cured for 70 seconds at 180° C. and tested. The fabric showed good wrinkle resistance, good physical properties and uniformly high resistance to chlorine degradation. It was generally the same as the product of Example VII.

It has been determined that .13% Catalyst AC will neutralize about .01% NaOH on fabric at 70% pick-up. Therefore 3.9% of Catalyst AC was required for neutralization, and 1.6% was available for catalysis.

In the foregoing examples only Catalyst AC has been shown. Similar series have been run with other catalysts, such as monoethanolamine hydrochloride, diammonium phosphate, ammonium chloride, and calcium chloride. These catalysts are well known in the textile industry, and this invention is directed to a process using the known catalysts and not to the catalyst per se.

By the same token, most of the examples refer to air drying the fabric and thereafter curing for 70 seconds at 180° C. These are standard conditions which have been found most useful in testing the effectiveness of resin-forming materials on textile fabrics. It is well known in the art to dry by many different methods and to cure by many different techniques. The conventional curing times are normally from about one minute at 360° F. to 5 minutes at about 280° F. This is standard textile practice and the specific drying conditions and curing conditions form no part of the present invention.

*Example XI*

One thousand forty pounds (3.5 mols) of a 50% solids solution of dimethylol ethylene urea in water and ethylene glycol were placed in a stainless steel reaction kettle equipped with heating coils and a stirrer. One hundred twenty-six pounds (one mol) of melamine were added with stirring. The mixture was then adjusted to pH 6.5 to 6.8 by the addition of dilute hydrochloric acid solution. The temperature of the mixture was raised to 200° F. and was maintained for about five minutes. An intermediate condensation product was formed as evidenced by the fact that all of the melamine went into solution. This intermediate product was cooled to 150° F. and 324 pounds (4 mols) of formaldehyde (37%) were added. The solution was then heated to 160° F. for about 10 minutes, and was then neutralized to about pH 9.0 to 10.0. The product thus formed was clear and infinitely dilutable with water. A shelf sample of this product remained clear after two months without losing its infinite dilutability. The final product of this example was applied to cotton textile fabric in accordance with the procedure of Example X and the thus treated fabric was satisfactory in all respects, being indistinguishable by test from the fabrics produced by the procedures of Examples VII and X.

*Example XII*

One thousand forty pounds (3.5 mols) of a 50% solution of dimethylol ethylene urea in water and ethylene glycol were placed in a stainless steel reaction kettle equipped with heating coils and a stirrer. One hundred twenty-six pounds (1 mol) of melamine were added with stirring. The mixture was adjusted to pH 7.0 to 7.5 by the addition of dilute hydrochloric acid solution (or dilute sodium hydroxide solution). The temperature was raised to 200° F. and was maintained for about 15 minutes at 200° F. An intermediate condensation product was formed as evidenced by the fact that all of the melamine went into solution. This intermediate product was cooled to 150° F. and 324 pounds (4 mols) of formaldehyde (37%) were added. The solution was then heated to 180° F. and about 10 minutes later it was neutralized to about pH 9.0 to 10.0. The final product appeared to be stable and infinitely soluble in water. A shelf sample of this product remained clear after two months without losing its infinite dilutability. The final product of this example was applied to cotton textile fabric in accordance with the procedure of Example X and the thus treated fabric was satisfactory in all respects, being indistinguishable by test from the fabrics produced by the procedures of Examples VII and X.

*Example XIII*

Example XII was repeated using eight hundred seventy-four pounds (3.0 mols) of a 50% solids solution of dimethylol ethylene urea instead of one thousand forty pounds. A final product of about the same appearance and stability was obtained as in Example XII. The product also appeared equivalent to the product of Example XII in the treatment of textile fabric.

*Example XIV*

One thousand forty pounds (3.5 mols) of a 50% solution of dimethylol ethylene urea in water and ethylene glycol were placed in a stainless steel reaction kettle equipped with heating coils, a stirrer and a reflux condenser. One hundred twenty-six pounds (1 mol) of melamine were added with stirring, and enough sodium hydroxide solution was added to bring the pH of the mixture to 8.0 to 8.5. The mixture was refluxed for about 20 minutes (at about 215° F. to 220° F.). An intermediate condensation product was formed as evidenced by the fact that all of the melamine went into solution. The intermediate product was cooled to 150° F. and 243 pounds (3 mols) of formaldehyde (37%) were added. The solution was heated to 160° F. to 170° F., and the temperature was maintained for about 10 minutes. It was then adjusted to pH 9.0 to 9.5. The final product had about the same general properties as the products from the Examples 11 to 13 with respect to stability, clarity and textile treatment.

*Example XV*

One thousand forty pounds (3.5 mols) of a 50% solution of dimethylol ethylene urea in water and ethylene glycol were placed in a stainless steel reaction kettle equipped with heating coils, a stirrer and a reflux condenser. One hundred twenty-six pounds (1 mol) of melamine were added with stirring, and enough sodium hydroxide solution was added to bring the pH of the mixture to 10 to 11. The mixture was refluxed for about 25 minutes (at about 215° F. to 220° F.). An intermediate condensation product was formed as evidenced by the fact that all of the melamine went into solution. The intermediate product was cooled to 130° F. and 243 pounds (3 mols) of formaldehyde (37%) were added. The solution was adjusted to pH 7 to 7.5 using dilute hydrochloric acid solution, after which it was heated to 160° F. to 170° F. for 10 minutes. The product was cooled and was neutralized to pH 9 to 10. This final product was clear and infinitely dilutable with water and remained so after two months. It was equivalent to the products of Examples 11 to 14 in the treatment of textile fabrics.

*Example XVI*

Example XV was repeated under the same conditions except after the addition of formaldehyde, the solution was adjusted to pH 10 to 10.5. The final product had the same properties as the product from Example XV.

Thus it will be seen that the present invention provides a novel means of producing wrinkle resistant fabrics and a novel means for producing wrinkle resistant fabrics which do not have either the undesirable properties of degradation or yellowing from chlorine retention.

It will also be seen that the present invention provides novel chemicals and novel means for producing chemicals which find utility in the textile fields and in other fields in which resin-forming materials of the melamine-formaldehyde type resins and ethyleneurea-formaldehyde type resins have heretofore been used.

We claim:

1. The process which comprises reacting one mol of melamine with from about 3 to 6 mols of dimethylol ethylene urea, under alkaline conditions at a temperature of from about 180° F. to 220° F.

2. The process as set forth in claim 1, wherein, as an additional step, the thus formed product is reacted with from about 1–6 mols of formaldehyde under alkaline conditions at a temperature of from about 160° F. to 220° F.

3. The heat condensation product of from about 3 to 6 mols of dimethylol ethylene urea with one mol of melamine at a pH of at least 6.5.

4. The process which comprises condensing from about 3 to 6 mols dimethylolethylene urea with one mol melamine at a temperature from about 180° F. to reflux for a time sufficient to dissolve the melamine at from about pH 6.5 to pH 8.5, condensing the thus formed product with from about 1 to 6 mols formaldehyde at from about 160° F. to 180° F. for from about 10 to 30 minutes and thereafter adjusting the pH of the final product to from about 8 to 11.

5. The process which comprises condensing about 3 to 6 mols dimethylolethylene urea with one mol melamine at a temperature of from 180° F. to reflux at from about pH 6.5 to 8.5, condensing the thus formed product with from about 1 to 6 mols formaldehyde at from about 160° F. to 180° F. for from about 10 to 30 minutes at from about pH 6.5 to pH 11, and thereafter adjusting the pH of the final product to from about pH 8 to pH 11.

6. The process which comprises condensing about 3.5 mols dimethylolethylene urea with one mol melamine at a temperature of from about 180° F. to reflux at from about pH 6.5 to pH 8.5, condensing the thus formed product with about 4 mols formaldehyde at from about 160° F. to 180° F. for from about 10 to 30 minutes at from about pH 6.5 to pH 11, and thereafter adjusting the pH of the final product to from about pH 8 to pH 11.

7. The process which comprises condensing about 3.5 mols dimethylolethylene urea with one mol melamine at reflux at from about pH 6.5 to pH 8.5, condensing the thus formed product with from about 1 to 6 mols formaldehyde at from about 160° F. to 180° F. for from about 10 to 30 minutes at from about pH 6.5 to pH 8.5 and thereafter adjusting the pH of the final product to about 9.5.

8. The process which comprises condensing from about 3 to 6 mols of dimethylolethylene urea with 1 mol of melamine at a pH of about 6.5 to 8.5 and thereafter condensing the thus formed product with about 1 to 6 mols of formaldehyde.

9. The process which comprises condensing from about 3 to 6 mols of dimethylolethylene urea with 1 mol of melamine and thereafter condensing the thus formed product with about 1 to 6 mols of formaldehyde at a pH of about 6.5 to 8.5.

10. A stable water soluble condensation product of the process claimed in claim 8.

11. A stable water soluble condensation product of the process claimed in claim 9.

12. The process of condensing from about 3 to 6 mols of dimethylolethylene urea with 1 mol of melamine at a pH of 6.5 to 8.5 and thereafter condensing the thus formed product with about 1 to 6 mols of formaldehyde at a pH of about 6.5 to 8.5.

13. The process which comprises condensing about 3 to 6 mols dimethylolethylene urea with 1 mol melamine at a temperature of from 180° F. to reflux at from about pH 6.5 to pH 11, condensing the thus formed product with from about 1 to 6 mols formaldehyde at from about 160° F. to 180° F. for from about 10 to 30 minutes at from about pH 6.5 to pH 8.5, and thereafter adjusting the pH of the final product to from about pH 8 to pH 11.

14. The process which comprises condensing about 3.5 mols dimethylolethylene urea with 1 mol melamine at a temperature of from about 180° F. to reflux at from about pH 6.5 to pH 11, condensing the thus formed product with about 4 mols formaldehyde at from about 160° F. to 180° F. for from about 10 to 30 minutes at from about pH 6.5 to pH 8.5, and thereafter adjusting the pH of the final product to from about pH 8 to pH 11.

15. The process as set forth in claim 2 in which the pH during the condensation of melamine and dimethylolethylene urea is from about 10 to 11 and the pH of the final product after the second stage reaction with formaldehyde is adjusted to about pH 8.5 to pH 9.5.

16. In the process of treating bleached and mercerized cotton textile fabrics wherein fabric is impregnated with an aqueous solution containing a heat activated acidic catalyst and from about 5% to 20% of a resin-forming material and the impregnated fabric is heated to dry the fabric and cure the resin, that improvement which comprises substantially neutralizing the alkali in the fabric prior to completion of the cure and using as the resin-forming material the product produced in accordance with claim 2.

17. The process as set forth in claim 16 wherein said neutralization is accomplished by acidification of the fabric prior to impregnation with the resin solution.

18. The process as set forth in claim 16 wherein said neutralization is accomplished by using, in addition to the usual catalyst concentration, an excess of acid-forming catalyst, the excess being that amount required to neutralize substantially all the alkali in the fabric.

19. The process as set forth in claim 16 wherein the catalyst is an amine hydrochloride.

References Cited in the file of this patent

UNITED STATES PATENTS

| | | |
|---|---|---|
| 2,328,425 | D'Alelio | Aug. 31, 1943 |
| 2,380,239 | Howald | July 10, 1945 |
| 2,548,416 | Barsky | Apr. 10, 1951 |
| 2,690,404 | Spangler et al. | Sept. 28, 1954 |
| 2,764,573 | Reibnitz et al. | Sept. 25, 1956 |

OTHER REFERENCES

Evans et al.: Abstract of application Ser. No. 576,508, published Nov. 1, 1949.